US010626202B2

(12) United States Patent
Foettinger et al.

(10) Patent No.: US 10,626,202 B2
(45) Date of Patent: Apr. 21, 2020

(54) MONOMODAL COPOLYMER OF ETHYLENE FOR INJECTION MOLDING AND PROCESS FOR ITS PREPARATION

(75) Inventors: Klaus Foettinger, Kelkheim (DE); Manfred Hecker, Neustadt (DE); Lothar Berger, Bonn (DE); Rainer Karer, Kaiserslautern (DE); Dieter Lilge, Limburgerhof (DE)

(73) Assignee: Basell Polyolefine GmbH, Wesseling (DE)

( * ) Notice: Subject to any disclaimer, the term of this patent is extended or adjusted under 35 U.S.C. 154(b) by 591 days.

(21) Appl. No.: 12/449,082

(22) PCT Filed: Jan. 15, 2008

(86) PCT No.: PCT/EP2008/050384
§ 371 (c)(1),
(2), (4) Date: Jul. 22, 2009

(87) PCT Pub. No.: WO2008/092736
PCT Pub. Date: Aug. 7, 2008

(65) Prior Publication Data
US 2010/0144988 A1 Jun. 10, 2010

Related U.S. Application Data

(60) Provisional application No. 60/901,075, filed on Feb. 13, 2007.

(30) Foreign Application Priority Data

Feb. 1, 2007 (EP) .................................... 07002187

(51) Int. Cl.
| C08F 210/16 | (2006.01) |
| C08F 2/34 | (2006.01) |
| C08F 4/24 | (2006.01) |
| B29C 45/00 | (2006.01) |

(52) U.S. Cl.
CPC ................. C08F 210/16 (2013.01)

(58) Field of Classification Search
USPC .................. 526/104, 106; 502/319
See application file for complete search history.

(56) References Cited

U.S. PATENT DOCUMENTS

| 3,242,150 | A | | 3/1966 | Scoggin |
| 3,248,179 | A | | 4/1966 | Norwood |
| 4,302,566 | A | | 11/1981 | Karol et al. |
| 4,543,399 | A | | 9/1985 | Jenkins, III et al. |
| 4,764,056 | A | | 8/1988 | Zentgraf et al. |
| 5,935,897 | A | | 8/1999 | Trubenbach et al. |
| 6,174,981 | B1 | | 1/2001 | Bergmeister et al. |
| 6,252,017 | B1 | | 6/2001 | Debras et al. |
| 6,649,709 | B1 | * | 11/2003 | Bauer et al. .................... 526/88 |
| 6,849,699 | B2 | | 2/2005 | Bauer et al. |
| 6,867,278 | B2 | * | 3/2005 | McDaniel et al. ......... 526/348.5 |
| 2003/0199648 | A1 | | 10/2003 | McDaniel et al. |
| 2003/0232715 | A1 | * | 12/2003 | Katzen et al. ................ 502/107 |

FOREIGN PATENT DOCUMENTS

| CA | 1069648 A1 | 1/1980 | | |
| EP | 0120503 | 4/1987 | | |
| EP | 0241947 | 10/1992 | | |
| JP | 2002-080520 A | 3/2002 | | |
| JP | 2002-187915 A | 7/2002 | | |
| WO | WO 97/04015 | 6/1997 | | |
| WO | WO 00/31090 | 2/2000 | | |
| WO | WO 00/71615 | 11/2000 | | |
| WO | WO 03/044063 | 5/2003 | | |
| WO | WO 2005/103096 | 3/2005 | | |
| WO | WO 2005103100 A1 * | 11/2005 | ............. | C08F 10/02 |
| WO | WO 2006/114209 | 2/2006 | | |
| WO | WO 2006/114210 | 2/2006 | | |
| WO | WO 2006048254 A1 * | 5/2006 | ............. | C08L 23/04 |
| WO | WO 2007088001 A1 * | 8/2007 | ........... | C08F 210/02 |
| WO | WO 2007/088001 | 9/2007 | | |

* cited by examiner

*Primary Examiner* — Fred M Teskin

(57) ABSTRACT

Monomodal copolymers of ethylene and molding compositions comprising such copolymers, wherein the copolymers have a density determined according to DIN EN ISO 1183-1, variant A in the range from 0.938 to 0.944 g/cm³, a melt index $MFR_{21}$ determined according to ISO 1133 at 190° C. under a load of 21.6 kg in the range from 12 to 17 g/10 min, a weight average molar mass $M_w$ in the range from 140 000 g/mol to 330 000 g/mol, a polydispersity $M_w/M_n$ in the range from 9 to 17, and a content of comonomer side chains per 1000 carbon atoms $C_x$ equal to or above a value defined via equation (I) $C_x=128.7-134.62\times d'$, wherein d' is the numerical value of the density of the copolymer in g/cm³, the use of the copolymers for producing injection-molded articles, as well as injection-molded articles comprising the copolymers, and process for the preparation of such monomodal copolymers.

5 Claims, No Drawings

MONOMODAL COPOLYMER OF ETHYLENE FOR INJECTION MOLDING AND PROCESS FOR ITS PREPARATION

CROSS-REFERENCE TO RELATED APPLICATIONS

This application is the U.S. national stage under 35 U.S.C. § 371 of International Application PCT/EP2008/050384, filed Jan. 15, 2008, claiming priority to EP Patent Application No. 07002187.8, filed Feb. 1, 2007, and provisional U.S. Appl. No. 60/901,075, filed Feb. 13, 2007; the disclosures of International Application PCT/EP2008/050384, EP Patent Application No. 07002187.8, and provisional U.S. Appl. No. 60/901,075, each as filed, are incorporated herein by reference.

FIELD OF INVENTION

The invention relates to copolymers of ethylene having a specific density, melt index, weight average molar mass $M_w$, polydispersity $M_w/M_n$, and special content of comonomer side chains, and to molding compositions comprising at least one of such copolymers. Furthermore, the invention relates to the use of these copolymers for producing injection-molded articles, to injection-molded articles comprising such copolymers, and to a process for the preparation of such copolymers.

BACKGROUND OF INVENTION

Molding compositions based on ethylene polymers for producing articles such as caps and closures of all types, engineering parts, and fittings for automobiles, such as guiders, handles, roll-over-valves and fuel tank module parts, by means of injection molding are known. Such articles have a number of requirements, for example they have to retain their dimensions and shape, i.e. not to shrink (low shrinkage) and to show low warpage, after the injection molding process, i.e. on cooling. The injection molding process is generally made easier when the polyethylene molding compositions readily flow in the melt (good flowability). Low shrinkage and shape stability are important properties of polyethylenes from which, for example, accurately fitting engineering parts are to be produced.

Ethylene polymers with properties meeting the above mentioned requirements have hitherto been the so-called multimodal products which comprise at least one relatively low-molecular-weight polymer component and at least one relatively high-molecular-weight polymer component within the polymer. Particularly good properties are obtained when the comonomer content of the relatively low-molecular-weight polymer component is minimized and the comonomer content of the relatively high-molecular-weight polymer component is maximized.

The simplest method of achieving this is to produce the at least two components separately and mix them with one another. As an alternative, the polymer components can be produced in series or in parallel in-situ. In series, this is achieved in a cascade process by preparing one of the polymer components in a first stage and preparing the second component in the subsequent stage. For this, substantial use is made of Ziegler catalysts, which have good hydrogen-controllability and therefore make it easy to adjust the molar mass within the stages. Chromium catalysts are substantially unsuitable for this purpose because they have insufficient hydrogen-controllability. Finally, in relatively recent times attempts have been made to produce the relatively high-molecular-weight and relatively low-molecular-weight components by using what are known as hybrid or mixed catalysts. These generally comprise two or more catalyst components, which can produce the relatively high-molecular-weight and relatively low-molecular-weight polymer components in parallel.

Ethylene polymers prepared using chromium catalysts are particularly suitable for production of blown films, and for blow molding. However, products prepared with the aid of a chromium catalyst have unsuitable comonomer distribution because most of the comonomer is incorporated within the low-molecular-weight fraction of the polymer. The result of this is major restrictions on product properties, in particular the stiffness, impact strength, and environmental stress cracking resistance (ESCR) relation.

PRIOR ART

WO 00/71615 describes injection-molded containers comprising a bimodal polyethylene having a density in the range from 0.950 to 0.98 g/cm$^3$, a crystallinity of 60-90% and comprising at least two polyethylene components which have different molar mass distributions and of which at least one is an ethylene copolymer. To produce such polyethylene blends, a reactor cascade was used or the two components were mixed by melt extrusion.

WO 2006/114210 describes injection-molded articles showing improved optical properties, which articles are based on monomodal polyethylenes made by use of metallocene catalysts and having a high load melt index MFR$_{21}$ in the range from 0.5 to 10 g/10 min, an average molar mass in the range from 50 000 to 150 000 g/mol, and a density in the range from 0.94 to 0.96 g/cm$^3$.

WO 2005/103096 describes mono-, bi- and multimodal polyethylenes having a density in the range from 0.945 to 0.965 g/cm$^3$, a MFR$_{21}$ in the range from 10 to 300 g/10 min, and an average molar mass in the range from 50 000 to 150 000 g/mol. These polyethylenes are made by use of a catalyst system consisting of metallocenes and special iron complexes. Injection-molded articles comprising such polyethylenes are also disclosed.

WO 2006/114209 describes molding compositions based on bimodal polyethylenes made by use of mixed catalyst systems and having a melt index MI in the range from 0 to 3.5 g/10 min, a density in the range from 0.915 to 0.955 g/cm$^3$, and a polydispersity $M_w/M_n$ in the range from 5 to 20. These moulding compositions are used to prepare films with high transparency and gloss.

The German patent application DE 102006004672.2 describes monomodal ethylene copolymers and a process for their preparation using chromium catalysts, wherein the ethylene copolymers have a special tensile impact strength and special content of comonomer side chains. These ethylene copolymers show a MFR$_{21}$ in the range from 3 to 12, a density in the range from 0.940 to 0.955, and a weight average molar mass above 330 000 g/mol.

Although the cascade processes mentioned, or processes using hybrid catalysts, can adjust product properties very flexibly, the processes are complicated and expensive because of the need to produce at least two polymer components. Furthermore, the mechanical stressability of shaped articles comprising polyethylene also has to meet increasingly stringent requirements and the known molding compositions still leave something to be desired in respect of the combined property profile of good flowability and high mechanical stressability. Especially, engineering parts and fittings for automobiles, in particular for fuel tanks, have to fulfil a number of requirements, for example stress crack resistance, impact resistance, low warpage and shrinkage.

SUMMARY OF THE INVENTION

An object of the present invention was therefore to provide polyethylenes and molding compositions which have good processability, especially in terms of flowability, combined with good mechanical properties and which can be advantageously prepared in a single reactor Surprisingly, it has been found that this object can be achieved by a monomodal copolymer of ethylene and at least one other 1-olefin, having a density determined according to DIN EN ISO 1183-1, variant A in the range from 0.938 to 0.944 g/cm$^3$, a melt index MFR$_{21}$ determined according to ISO 1133 at 190° C. under a load of 21.6 kg in the range from 12 to 17 g/10 min, a weight average molar mass M$_w$ in the range from 140 000 g/mol to 330 000 g/mol, a polydispersity M$_w$/M$_n$ in the range from 9 to 17, and a content of comonomer side chains per 1000 carbon atoms C$_x$ equal to or above a value defined by equation (I)

$$C_x = 128.7 - 134.62 \times d' \qquad (I),$$

wherein d' is the numerical value of the density of the copolymer in g/cm$^3$.

The copolymers of the invention are monomodal. For the purposes of the present patent application, a monomodal copolymer is a copolymer whose molar mass distribution is monomodal. For the purposes of the present patent application, a monomodal molar mass distribution means that the molar mass distribution curve has a single maximum.

Accordingly, we have found a molding composition comprising at least one monomodal copolymer of ethylene and at least one other 1-olefin, having a density determined according to DIN EN ISO 1183-1, variant A in the range from 0.938 to 0.944 g/cm$^3$, a melt index MFR$_{21}$ determined according to ISO 1133 at 190° C. under a load of 21.6 kg in the range from 12 to 17 g/10 min, a weight average molar mass M$_w$ in the range from 140 000 g/mol to 330 000 g/mol, a polydispersity M$_w$/M$_n$ in the range from 9 to 17, and a content of comonomer side chains per 1000 carbon atoms C$_x$ above a value defined by equation (I).

Furthermore, we have found the use of the monomodal copolymer of ethylene and at least one other 1-olefin for producing injection-molded articles, and injection-molded articles comprising the copolymers of ethylene and one other 1-olefin, especially engineering parts and tank fittings comprising such copolymer.

Additionally, we have found a process for the preparation of monomodal copolymers of ethylene and at least one other 1-olefin having a density determined according to DIN EN ISO 1183-1, variant A of from 0.938 to 0.944 g/cm$^3$, a melt index MFR$_{21}$ determined according to ISO 1133 at 190° C. under a load of 21.6 kg in the range from 12 to 17 g/10 min, a weight average molar mass M$_w$ in the range from 140 000 g/mol to 330 000 g/mol, a polydispersity M$_w$/M$_n$ in the range from 9 to 17, and a content of comonomer side chains per 1000 carbon atoms C$_x$ above a value defined by equation (I), comprising the step of copolymerizing ethylene with at least one C$_3$-C$_{12}$ 1-olefin.

The ethylene copolymers can be prepared in a simple way at low cost. They show good environmental stress cracking resistance and high impact strength together with good processability. Furthermore, they show low shrinkage and warpage after processing and heat aging, and high elongation at break. These good mechanical properties are combined with good processability.

The copolymers of ethylene of the invention have a density in the range from 0.938 to 0.944 g/cm$^3$, preferably from 0.939 to 0.943 g/cm$^3$, especially to 0.942 g/cm$^3$, and particularly preferably in the range from 0.940 to 0.942 g/cm$^3$. In the present description and in the following claims, the density [g/cm$^3$] is determined in accordance with DIN EN ISO 1183-1, variant A.

The high load melt index MFR$_{21}$ is in the range from 12 to 17 g/10 min, preferably from 13 to 16 g/10 min, and particularly preferably in the range from 14 to 16 g/10 min. In the present description and in the following claims, the high load melt index MFR$_{21}$ is determined at 190° C. under a load of 21.6 kg (190° C./21.6 kg) in accordance with ISO 1133.

The weight average molar mass M$_w$ of the copolymers of the invention is in the range from 140 000 g/mol to 330 000 g/mol, preferably from 150 000 g/mol to 300 000 g/mol and particularly preferably from 170 000 g/mol to 270 000 g/mol. Especially preferred is a weight average molar mass M$_w$ in the range from 175 000 to 220 000.

The polydispersity M$_w$/M$_n$ of the ethylene homo- and copolymers of the invention is in the range from 9 to 17, preferably from 10 to 16 and particularly preferably from 11 to 16.

The determination of the molar mass distributions and the means M$_n$, M$_w$ and M$_w$/M$_n$ derived therefrom is carried out by means of high-temperature gel permeation chromatography in using a method based on DIN 55672 on a WATERS 150 C with the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 µl injection volume, temperature: 135° C., calibration using PE standards.

The copolymers of the invention preferably have a melt index MI$_5$ in the range from 0.05 to 2 g/10 min, preferably from 0.1 to 1.5 g/10 min and particularly preferably from 0.5 to 1 g/10 min. In the present description and in the following claims, the melt index MI$_5$ index is determined at 190° C. under a load of 5 kg (190° C./5 kg) in accordance with ISO 1133.

Preferred embodiments of the invention are copolymers of ethylene having properties showing combinations of the preferred ranges of two or more of the described characteristic properties, i.e. density, MI$_{21}$, M$_w$, M$_w$/M$_n$, and/or content of comonomer side chains. In particular, these copolymers are monomodal.

A preferred embodiment of the present invention is a copolymer of ethylene and at least one other 1-olefin having a density in the range from 0.939 to 0.943 g/cm$^3$, a melt index MI$_{21}$ in the range from 13 to 16 g/10 min, a weight average molar mass M$_w$ in the range from 150 000 g/mol to 300 000 g/mol, a polydispersity M$_w$/M$_n$ in the range from 10 to 16, and a content of comonomer side chains per 1000 carbon atoms C$_x$ equal to or above a value defined by equation (I).

A particularly preferred embodiment of the invention is a copolymer of ethylene and at least one other 1-olefin having a density in the range from 0.940 to 0.942 g/cm$^3$, a melt index MI$_{21}$ in the range from 14 to 16 g/10 min, a weight average molar mass M$_w$ in the range from 170 000 g/mol to 270 000 g/mol, especially in the range from 175 000 to 220 000 g/mol, a polydispersity M$_w$/M$_n$ in the range from 11 to 16, and a content of comonomer side chains per 1000 carbon atoms $C_x$ equal to or above a value defined by equation (I).

In another preferred embodiment of the invention the copolymers have a density in the range from 0.938 to 0.944 g/cm$^3$, especially from 0.939 to 0.942 g/cm$^3$, a melt index $MI_{21}$ in the range from 12 to 17 g/10 min, a weight average molar mass $M_w$ in the range from 140 000 g/mol to 330 000 g/mol, a polydispersity $M_w/M_n$ in the range from 9 to 17, a content of comonomer side chains per 1000 carbon atoms $C_x$ equal to or above a value defined by equation (I), and a $MI_5$ in the range from 0.05 to 2 g/10 min, preferably from 0.1 to 1.5 g/10 min and particularly preferably from 0.5 to 1 g/10 min.

In another preferred embodiment of the invention the copolymers of ethylene have a density in the range from 0.940 to 0.942 g/cm$^3$, a melt index $MI_{21}$ in the range from 14 to 16 g/10 min, a weight average molar mass $M_w$ in the range from 170 000 g/mol to 270 000 g/mol, a polydispersity $M_w/M_n$ in the range from 11 to 16, a content of comonomer side chains per 1000 carbon atoms $C_x$ equal to or above a value defined by equation (I), and a $MI_5$ in the range from 0.1 to 1.5 g/10 min, preferably from 0.5 to 1 g/10 min.

As comonomers which may be present in addition to ethylene in the ethylene copolymer part of the molding composition of the invention, either individually or in admixture with one another, it is possible to use all 1-olefins having from 3 to 12 carbon atoms. Preferred 1-olefins are linear or branched $C_2$-$C_{10}$-1-alkenes, in particular linear $C_2$-$C_{10}$-1-alkenes such as e.g. propene, 1-butene, 1-pentene, 1-hexene, 4-methyl-1-pentene, 1-heptene, 1-octene and 1-decene. The ethylene copolymer preferably comprises, as comonomer unit, 1-olefins having from 4 to 9 carbon atoms, e.g. 1-butene, 1-pentene, 1-hexene, 4-methylpentene or 1-octene, in copolymerized form. Particular preference is given to using 1-olefins selected from the group consisting of 1-butene, 1-hexene and 1-octene, especially 1-hexene is preferred. The ethylene copolymer preferably comprises from 0.01 to 5% by weight of comonomer and particularly preferably from 0.1 to 2% by weight of comonomer.

In a preferred embodiment of the invention, the monomodal copolymer has from 0.1 to 10 comonomer side chains/1000 carbon atoms, preferably from 0.2 to 5 comonomer side chains/1000 carbon atoms and particularly preferably from 0.3 to 5 comonomer side chains/1000 carbon atoms.

In another preferred embodiment of the invention, the copolymer of the invention has a content of comonomer side chains per 1000 carbon atoms $C_x$ in a range which is restricted by a lower limit defined by equation (I) and an upper limit defined by equation (II)

$$C_x = 129.7 - 134.86 \times d' \quad (II),$$

wherein d' is the numerical value of the density of the copolymer in g/cm$^3$.

According to the invention, the density is in the range from 0.938 to 0.944 g/cm$^3$, preferably from 0.939 to 0.943 g/cm$^3$, especially to 0.942 g/cm$^3$, and particularly preferably in the range from 0.940 to 0.942 g/cm$^3$.

The content of comonomer side chains is determined by multiple variate data analysis by means with IR analysis.

The copolymer of ethylene and at least one other 1-olefine, of the invention preferably has a content of internal trans double bonds —CH═CH—, hereinafter referred to as trans vinyl groups, of at least 0.01 trans vinyl groups/1000 carbon atoms, in particular from 0.02 to 1 trans vinyl groups/1000 carbon atoms and particularly preferably from 0.04 to 0.9 trans vinyl groups/1000 carbon atoms. The determination is carried out in accordance with ASTM D 6248-98.

In a preferred embodiment of the invention, the monomodal copolymer comprises at least 0.5 ppm of chromium. Preferably, the chromium content is not greater than 30 ppm, more preferably not greater than 10 ppm. The chromium content can be determined photometrically by way of the peroxide complex.

The present invention provides a molding composition comprising a monomodal copolymer of ethylene having at least one of the preferred properties described in detail in the foregoing. Especially preferred are molding compositions comprising at least one copolymer of ethylene and at least one other 1-olefin having a density in the range from 0.939 to 0.943 g/cm$^3$, especially to 0.942 g/cm$^3$, a melt index $MI_{21}$ in the range from 13 to 16 g/10 min, a weight average molar mass $M_w$ in the range from 150 000 g/mol to 300 000 g/mol, a polydispersity $M_w/M_n$ in the range from 10 to 16, and a content of comonomer side chains per 1000 carbon atoms $C_x$ equal to or above a value defined by equation (I).

Particularly preferred are molding compositions comprising at least one copolymer of ethylene and at least one other 1-olefin having a density in the range from 0.940 to 0.942 g/cm$^3$, a melt index $MI_{21}$ in the range from 14 to 16 g/10 min, a weight average molar mass $M_w$ in the range from 170 000 g/mol to 270 000 g/mol, especially in the range from 175 000 to 220 000, a polydispersity $M_w/M_n$ in the range from 11 to 16, and a content of comonomer side chains per 1000 carbon atoms $C_x$ equal to or above a value defined by equation (I).

Especially, the preferred monomodal copolymers described in the foregoing having a content of comonomer side chains per 1000 carbon atoms $C_x$ in a range which is restricted by a lower limit defined by equation (I) and an upper limit defined by equation (II) are suitable for molding compositions.

In addition, the molding compositions of the invention can further comprise from 0 to 6% by weight, preferably from 0.1 to 1% by weight, based on the mass of the ethylene polymers, of the customary additives for thermoplastics, e.g. processing stabilizers, stabilizers against the effects of light and heat, customary additives such as lubricants, antioxidants, antiblocking agents and antistatics, and also, if appropriate, dyes. Preference is given to using, inter alia, lubricants (Ca stearate); customary stabilizers, for example phenols, phosphites, benzophenone, benzotriazoles or thioethers; fillers, for example TiO$_2$, chalk or carbon black; customary pigments, for example TiO$_2$, ultramarine blue. The additives are usually incorporated by mixing with the molding composition using the methods customary in plastics technology, for example melt extrusion, rolling, compacting or solution mixing. Preference is given to using melt extrusion, for example in a twin-screw extruder. In general, the extrusion temperatures are in the range from 140 to 250° C.

We have also found the use of the copolymers of the invention for producing injection-molded articles and injection-molded articles comprising the copolymers of ethylene and at least one other 1-olefin having a density in the range from 0.938 to 0.944 g/cm$^3$, a $MI_{21}$ in the range from 12 to 17 g/10 min, a weight average molar mass $M_w$ in the range from 140 000 g/mol to 330 000 g/mol, a polydispersity $M_w/M_n$ in the range from 9 to 17, and a content of comonomer side chains per 1000 carbon atoms $C_x$ equal to or above a value defined by equation (I), Preferred embodiments of the injection-molded articles are those comprising the preferred and, respectively, especially preferred embodiments of the copolymers as described in detail in the foregoing.

The copolymers of the invention, the molding compositions comprising such copolymers, and the articles made therefrom show several enhanced properties, i.e. impact strength, environmental stress cracking resistance, elongation at break, flowability, and low shrinkage and warpage after processing and heat aging.

The flow properties under processing conditions were determined using the spiral test. The copolymer is, for this purpose, injected at a defined temperature, pressure and screw speed into a spiral mould. This gives copolymer spirals having a particular wall thickness. The length of the spirals is a measure of the flow properties of the copolymer used.

In particular, the monomodal copolymers of the invention having a $MI_{21}$ of 14-16 display good flow properties with spiral lengths of above 40 cm, measured at a melt temperature of 250° C., an injection pressure of 750 bar, a screw diameter of 3 cm, a screw speed of 100 min$^{-1}$, a mould temperature of 30° C. and a wall thickness of 2 mm, combined with good dimensional and shape stability (low shrinkage).

To test the dimensional and shape stability of the copolymers of the invention, plastic plates (208.1 mm×146.1 mm×4 mm) were produced in an injection molding machine provided with a plate tool at 230° C. and 80 bar, the specimens were allowed to cool to room temperature. After 24 h at room temperature, and, respectively, 48 h at 80 C, the specimens were measured. The mean in mm was calculated, the deviation from the plate tool was determined and the test specimens were assessed visually for dimensional and shape stability.

The molding composition of the invention is obtainable using the catalyst compositions described below in detail, in particular the preferred embodiments of these catalyst compositions. Generally, all chromium catalysts can be used in the process of the invention. Preferably, supported chromium catalysts are used. Many of these chromium catalysts, also referred to as Phillips catalysts, have been known for many years.

The support can be any organic or inorganic, inert solid, in particular a porous support such as talc, inorganic oxides and finely divided polymer powders (e.g. polyolefins). Preference is given to using finely divided supports which can be any organic or inorganic, inert solid. In particular, the support component can be a porous support such as talc, a sheet silicate, or an inorganic oxide.

Inorganic oxides suitable as supports may be found among oxides of the elements of groups 2, 3, 4, 5, 13, 14, 15 and 16 of the Periodic Table of the Elements. Preference is given to oxides or mixed oxides of the elements calcium, aluminum, silicon, magnesium or titanium and also corresponding oxide mixtures. Other inorganic oxides which can be used on their own or in combination with the abovementioned oxidic supports are, for example, $ZrO_2$ or $B_2O_3$. Preferred oxides are silicon dioxide, in particular in the form of a silica gel or a pyrogenic silica, or aluminum oxide.

The support used preferably have a specific surface area in the range from 10 to 1000 m$^2$/g, preferably from 50 to 500 m$^2$/g and in particular from 200 to 400 m$^2$/g, and preferably a pore volume in the range from 0.1 to 5 ml/g, preferably from 0.5 to 3.5 ml/g and in particular from 0.8 to 3.0 ml/g. The mean particle size of the finely divided supports is generally in the range from 1 to 500 μm, preferably from 5 to 350 μm and in particular from 10 to 100 μm.

The inorganic support can be subjected to a thermal treatment, e.g. for removing adsorbed water. Such a drying treatment is generally carried out at from 80 to 300° C., preferably from 100 to 200° C., and is preferably carried out under reduced pressure and/or in a stream of inert gas, for example nitrogen or argon. The inorganic support can also be calcined, in which case the concentration of OH groups on the surface is adjusted and the structure of the solid may be altered by a treatment at from 200 to 1000° C. The support can also be treated chemically using customary desiccants such as metal alkyls, preferably aluminum alkyls, chlorosilanes or $SiCl_4$, or else methyl-aluminoxane. Appropriate treatment methods are described, for example, in WO 00/31090.

The inorganic support material can also be chemically modified. For example, the treatment of silica gel with $NH_4SiF_6$ leads to fluorination of the silica gel surface and treatment of silica gels with silanes containing nitrogen-, fluorine- or sulfur-containing groups gives correspondingly modified silica gel surfaces.

Particularly suitable support materials are inorganic compounds, especially porous oxides such as $SiO_2$, $Al_2O_3$, MgO, $ZrO_2$, $B_2O_3$, CaO, ZnO or mixtures of these oxides. The support materials preferably exhibit a particle size between 1 and 300 μm, particularly from 30 to 70 μm. Examples of particularly preferred supports are spray dried $SiO_2$, especially those having a pore volume of from 1.0 to 3.0 ml/g, preferably from 1.2 to 2.2 ml/g and more preferably from 1.4 to 1.9 ml/g and a surface area (BET) of from 100 to 500 m$^2$/g and preferably from 200 to 400 m$^2$/g. Such products are commercially available, for example as Silica XPO 2107 sold by Grace.

Doping of the catalyst support with the active component containing chromium preferably takes place from a solution or, in the case of volatile compounds, from the vapour phase. Suitable chromium compounds are chromium(VI) oxide, chromium salts such as chromium(III) nitrate and chromium (III) acetate, complex compounds such as chromium(III) acetylacetonate or chromium hexacarbonyl, or alternatively organometallic compounds of chromium such as bis(cyclopentadienyl)chromium(II), organic chromic esters or bis (aren)chromium(0). Cr(III) nitrate is preferably used.

The support is generally loaded by contacting the support material, in a solvent, with a chromium compound, removing the solvent and calcining the catalyst at a temperature of from 400 to 1100° C. The support material can for this purpose be suspended in a solvent or in a solution of the chromium compound.

In addition to the chromiferous active component, other doping substances can be applied to the support system. Examples of suitable such doping substances are compounds of boron, fluorine, aluminum, silicon, phosphorus and titanium. These doping substances are preferably applied to the support together with the chromium compounds but can alternatively be applied to the support in a separate step before or after the application of chromium.

Examples of solvents suitable for use when doping the support are water, alcohols, ketones, ethers, esters and hydrocarbons, methanol being particularly suitable.

The concentration of the doping solution is generally from 0.1 to 200, preferably from 1 to 50, grams of chromium compound per litre of solvent.

The ratio by weight of chromium compounds to the support during application is generally from 0.001:1 to 200:1, preferably from 0.005:1 to 100:1.

According to one embodiment of the process of the invention, the chromium catalyst is prepared by adding small amounts of MgO and/or ZnO to the inactive pre-catalyst and subsequently activating this mixture in conventional manner. This measure improves the electrostatic properties of the catalyst.

For activation, the dry pre-catalyst is calcined at temperatures between 400 and 1100° C., for example in a fluidized-bed reactor in an oxidizing atmosphere containing oxygen. Cooling preferably takes place under an inert gas atmosphere in order to prevent adsorption of oxygen. It is also possible to carry out this calcination in the presence of fluorine compounds, such as ammonium hexafluorosilicate, by which means the catalyst surface is modified with fluorine atoms.

Calcination of the pre-stage preferably takes place in a vapour-phase fluidized bed. According to one preferred embodiment, the mixture is first heated to from 200 to 400° C., preferably to from 250 to 350° C., with fluidization thereof by pure inert gas, preferably nitrogen, which is subsequently replaced by air, whereupon the mixture is heated to the desired end temperature. The mixture is kept at the end temperature for a period of from 2 to 20 hours and preferably from 5 to 15 hours, after which the flow of gas is switched back to inert gas, and the mixture is cooled.

According to a preferred embodiment of the process of the invention, a supported chromium catalyst is used which has been activated at a temperature of from 600 to 800° C., more preferably at a temperature between 650° and 750° C.

In the copolymerization process of the invention, ethylene is polymerized with 1-olefins having from 3 to 12 carbon atoms. Preferred 1-olefins are described in detail in the foregoing. Preference is given to using monomer mixtures comprising at least 50 mol % of ethene.

The process of the invention for the copolymerization of ethylene with 1-olefins can be carried out using all industrially known polymerization processes at temperatures in the range from −60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes or gas-phase fluidized-bed processes are all possible.

The polymerizations are usually carried out at temperatures in the range from −60 to 350° C., preferably in the range from 20 to 300° C., and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are usually carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, a temperature which is at least a few degrees below the softening temperature of the polymer is generally set. In particular, temperatures of from 50 to 180° C., preferably from 70 to 120° C., are set in these polymerization processes. In the case of suspension polymerizations, the polymerization is usually carried out in a suspension medium, preferably in an inert hydrocarbon, such as isobutane, or a mixture of hydrocarbons or else in the monomers themselves. The polymerization temperatures are generally in the range from −20 to 115° C., and the pressure is generally in the range from 1 to 100 bar. The solids content of the suspension is generally in the range from 10 to 80%. The polymerization can be carried out either batchwise, e.g. in stirring autoclaves, or continuously, e.g. in tube reactors, preferably in loop reactors. Particular preference is given to employing the Phillips PF process as described in U.S. Pat. Nos. 3,242,150 and 3,248,179. The gas-phase polymerization is generally carried out at from 30 to 125° C. at pressures of from 1 to 50 bar.

Among the polymerization processes mentioned, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed mode, in which part of the circulating gas is cooled to below the dew point and is recirculated as a two-phase mixture to the reactor. It is also possible to use a multizone reactor in which two polymerization zones are linked to one another and the polymer is passed alternately through these two zones a number of times. The two zones can also have different polymerization conditions. Such a reactor is described, for example, in WO 97/04015. A parallel reactor arrangement using two or more identical or different processes is also possible. Furthermore, molar mass regulators, for example hydrogen, or customary additives such as antistatics can also be used in the polymerizations.

The polymerization is carried out in a single reactor, preferably in a gas-phase reactor. The polyethylene of the invention is obtained in the polymerization of ethylene with 1-olefins having from 3 to 12 carbon atoms by means of the above mentioned catalysts, especially by means of the preferred catalysts. The polyethylene powder obtained directly from the reactor has a very high homogeneity, so that, unlike the case of cascade processes, subsequent extrusion is not necessary to obtain a homogeneous product.

In particular, the monomodal copolymers of the invention are prepared likewise to the process described in U.S. Pat. No. 6,849,699. Preferably, the reaction temperature is in a specific range to provide copolymers with the above described properties.

Accordingly, the present invention provides a continuous vapour-phase fluidized-bed process for the preparation of the monomodal copolymers described above, in which mixtures of ethylene and $C_3$-$C_{12}$ 1-monoolefins are copolymerized in the presence of a supported chromium catalyst in the polymerization zone of a vapour-phase fluidized-bed reactor under pressures ranging from 1 to 100 bar and at temperatures ranging from 30° to 125° C. In the vapour phase in an agitated bed of bulk material comprising particulate polymer, the resultant heat of polymerization is removed by cooling the recirculated reactor gas and the resulting copolymer is removed from the vapour-phase fluidized-bed reactor, wherein, for the preparation of the monomodal copolymers of the invention, the copolymerization is carried out at a temperature in a range which is restricted by an upper limit define by equation (III)

$$T_H = 173 + 6d'/(0.840 - d') \qquad (III)$$

and a lower limit defined by equation (IV)

$$T_L = 178 + 7.3d'/(0.837 - d') \qquad (IV)$$

in which the variables have the following meanings:
$T_H$ is the highest reaction temperature in ° C.;
$T_L$ is the lowest reaction temperature in ° C.;
d' is the numerical value of the density d of the copolymer to be synthesized.

For the process of the invention to be efficacious it is preferred, when preparing a copolymer of a specific density d, to carry out copolymerization at a temperature T in a range restricted by the upper limit defined by the above equation (III) and the lower limit defined by the above equation (IV). This means that temperatures T which are outside this range may not be used during the process of the invention, as the process will not otherwise be successful. In other words, equations (III) and (IV) indicate the highest reaction temperature $T_H$ and the lowest reaction temperature $T_L$ at which a copolymer having a certain desired density d can just be prepared using the process of the invention.

The process of the invention is preferably carried out in a vapour-phase fluidized-bed reactor, as described in detail in, for example, EP-A 0,004,645, EP-A 0,089,691, EP-A 0,120, 503 or EP-A 0,241,947. The vapour-phase fluidized-bed reactor is generally a more or less long tube through which flows recirculated reactor gas. The recirculated reactor gas is preferably fed to the lower end of the vapour-phase fluidized-bed reactor and is preferably withdrawn at the upper end thereof. The recirculated reactor gas comprises ethylene, if desired a molecular weight modifier such as hydrogen, and inert gases such as nitrogen and/or saturated hydrocarbons such as ethane, butane or hexane. Furthermore, the reactor gas comprises $C_3$-$C_{12}$ 1-olefins, such as propylene, 1-butene, 1-pentene, 1 hexene, 1-heptene and 1-octene. Preference is given to a process in which ethylene is copolymerized with 1-hexene. The velocity of the reactor gas, measured as void tube velocity, is preferably sufficiently high in order, on the one hand, to fluidize the agitated bed of particulate polymer located in the tube and serving as polymerization zone and, on the other hand, to remove the heat of polymerization in an effective manner.

In order to maintain constant reaction conditions, the components of the reactor gas can be fed to the vapour-phase fluidized-bed reactor either directly or via the recirculated reactor gas. It is generally found to be advantageous to introduce the aforementioned $C_3$-$C_{12}$ 1-olefins directly into the vapour-phase fluidized-bed reactor. Furthermore, it is of advantage to the process of the invention when the supported chromium catalyst is directly introduced into the agitated bed of particulate polymer. It has been found to be particularly advantageous to meter the catalyst by the method described in DE-A-3,544,915 portion wise together with nitrogen or argon directly into the bed of bulk material.

In order to avoid entrainment of particulate polymer from the polymerization zone into the gas system, the vapour-phase fluidized-bed reactor used for the process of the invention preferably exhibits, at the top, a steadying zone of greater diameter, which reduces the velocity of the recycled gas. It is preferable to reduce the velocity of the recycled gas in this steadying zone to one third to one sixth of the velocity of the recirculated gas in the polymerization zone.

The recirculated reactor gas coming out from the vapour-phase fluidized-bed reactor is preferably recirculated. The recirculated reactor gas is fed to a gas compressor and a gas condenser. Afterwards, the cooled and compressed recycled gas is preferably re-introduced into the agitated bed of bulk material of the vapour-phase fluidized-bed reactor preferably via a conventional gas distributor plate as commonly used. The result is an extremely homogeneous distribution of the vapour phase, which ensures thorough mixing of the bed of bulk material.

Also, in the process of the invention, the proportions of the starting products, and particularly the ratio of ethylene to $C_3$-$C_{12}$ 1-olefins, determine the density d of the resulting copolymer.

Furthermore, the amount of catalyst metered in determines the output of the vapour-phase fluidized-bed reactor. The capacity thereof is, as is well known, restricted by the cooling capacity of the recirculated reactor gas. This cooling capacity is governed on the one hand by the pressure which is exerted on the reactor gas or at which the copolymerization is carried out. In this case it is preferably to operate under pressures of from 1 to 100, preferably from 10 to 80 bar and more preferably from 15 to 50 bar. On the other hand, the cooling capacity is governed by the temperature at which the copolymerization is carried out in the agitated bed of particulate polymer. It is advantageous to operate the process of the invention at temperatures ranging from ° to 125° C.

It has been found to be particularly advantageous to use a process in which the temperature is preferably set in relation to the density such that the lower limit of the temperature/density function is given by the equation (IV).

The temperature and the content of inert gases such as nitrogen or hydrocarbons have an influence on the risk of coagulation and sedimentation. High inert gas concentrations do reduce the risk of sedimentation but at the same time they lower the space-time yield, so that the process may become uneconomical. In the process of the invention, the inert gas concentration is preferably from 25 to 55 vol % and more preferably from 35 to 50 vol %, based on the total volume of the reaction gas.

The copolymer produced by the process of the invention can be removed from the vapour-phase fluidized-bed reactor in conventional manner. Due to the special advantages of the process of the invention and the products thus produced, this removal may be effected for example by simply opening a ball stop-cock in an outlet pipe leading to a let-down tank. In this case the pressure in the let-down tank is kept as low as possible to enable transport to be effected over longer distances and in order to free the copolymers from adsorbed liquids such as residual monomers during this removal stage. Then, in the let-down tank, the copolymers can be purified further by purging with ethylene for example. The residual monomers that are thus desorbed, and the ethylene that is introduced as purging medium can be fed to a conventional condensing step, in which they are separated from each other, advantageously under standard pressure and at lower temperatures. The liquid residual monomers are preferably fed directly back to the bed of bulk material, but the ethylene used for purging and any gases that are still present can be compressed in a conventional compressor for recirculated gases and then returned to the recirculated reactor gas.

The copolymers that are present in the let-down tank can be further transported to a deodorizing or deactivating tank, in which they can be subjected to conventional treatment with nitrogen and/or steam.

It is also possible to run the process of the invention in the condensed mode with propane as cooling means for removing the resultant polymerization heat from the vapour-phase fluidized-bed reactor.

The property profile of the products according to the present invention makes them particularly suitable for production of injection-molded articles. Particularly advantageous applications are those for caps and closures of all types, for example screw caps and screw closures, for tube shoulders, for engineering parts, for pipe fittings and for fittings for automobiles, especially for fuel tank module parts. The present invention therefore also provides the use of the copolymers of the invention for the production of injection-molded articles, and provides injection-mouldings produced from the copolymers. In order to produce the articles mentioned, the copolymer of the invention is melted and injected into the moulds of the molding machine to give the appropriate shape. The injection-molded articles are produced on customary injection-molding machines. Screw lengths of 18-22 D are particularly useful. The injection-molding technique is well known to the person skilled in the art.

EXAMPLES

The following examples illustrate the invention without restricting its scope.

All of the ratios stated (%, ppm, etc.) in this application are based on weight, based on the total weight of the corresponding mixtures, unless otherwise stated.

The parameters used were determined in the following way:

The density [g/cm3] was determined in accordance with DIN EN ISO 1183-1, variant A.

The melt flow rate $MFR_{21}$ was determined according to ISO 1133 at a temperature of 190° C. under a load of 21.6 kg (190° C./21.6 kg).

The melt flow rate $MFR_5$ was determined according to ISO 1133 at a temperature of 190° C. under a load of 5 kg (190° C./5 kg).

The determination of the molar mass distributions and the means $M_n$, $M_w$ and $M_w/M_n$ derived therefrom was carried out by means of high-temperature gel permeation chromatography using a method based on DIN 55672 on a WATERS 150 C with the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 µl injection volume, temperature: 135° C., calibration using PE standards. Evaluation was carried out using WIN-GPC.

Environmental stress cracking resistance was determined as FNCT (full-notch creep test) according to ISO 16770: 2004 at 80° C. under tensile stress of 4 MPa. Test specimen B was produced from the pellets via pressing of a corresponding sheet.

Impact strength was determined as tensile impact strength $a_{tn}$ according to ISO 8256 (1997)/1A at −30° C. The test specimen was produced from the pellets by pressing.

The spiral test was carried out on a Krauss-Maffei machine using a closure force of 900 kN and a 2.5 mm die, measured at a melt temperature of 250° C., an injection pressure of 750 bar, a screw diameter of 3 cm, a screw speed of 100 $min^{-1}$ a mould temperature of 30° C. and a wall thickness of 2 mm and a width of 6 mm.

As tensile test at room temperature, the ultimate elongation was determined according to ISO 527.

The content of comonomer side chains/1000 carbon atoms was determined by means of infrared spectroscopy by use of an FTIR 2000 of Perkin Elmer, and is based on the total $CH_3$ group content/1000 carbon atoms including end groups. The comonomer content was determined by multiple variate data analysis.

Abbreviations in the following tables:
$M_w$ weight average molecular mass
$M_n$ number average molecular mass
$M_w/M_n$ polydispersity index
$MFR_{21}$ melt flow rate (190° C./21.6 kg)
$MFR_5$ melt flow rate (190° C./5 kg)
FNCT full-notch creep test

Example 1

Preparation of a Supported Chromium Catalyst

The support used was a spray dried $SiO_2$ support, having a surface area (BET) of 300 $m^2$/g and a pore volume of 1.60 ml/g. Such a support is available commercially from, for example, Grace under the trade name XP02107.

To 135 kg of the support there were added 192 l of a solution of $Cr(NO_3)_3$ $9H_2O$ in methanol (17 g/l), and after 1 hour the solvent was removed by distillation under reduced pressure.

The resulting intermediate contained 0.3 wt % of chromium.

The said intermediate product was calcined in a vapour-phase fluidized bed. The mixture was first of all heated to 300° C., with fluidization thereof by pure nitrogen, which was subsequently replaced by air, whereupon the mixture was heated until the desired end temperature of 700° C. had been reached. The mixture was kept at the end temperature over a period of 10 hours, after which the gas was switched back to nitrogen and the mixture cooled.

Example 2

Vapour-Phase Polymerization

Polymerization was carried out in a fluidized bed reactor. The reaction temperature was from 113 to 114° C., the pressure in the reactor was 21 bar. The reactor gas had the following composition: 49.7 vol % of ethylene, 0.22 vol % of 1-hexene, 2.6 vol % of hexane and 45 vol % of nitrogen. The catalyst used was the catalyst of example 1. Reaction conditions and polymer properties are shown in Table 1.

The polymer powder from the reactor was converted by means of twin-screw extruder into pellets in a temperature range from 222° C. to 240° C. The tests for determining environmental stress crack resistance and impact strength were performed on pressed sheets obtained from the pellets after pressing at 180° C. for 4 minutes at 90 bar and with a cooling rate of 15 K/min to room temperature. All other tests for determining polymer properties were performed on the pellets.

Example 3

Preparation of Injection Moulding Parts

For comparison with conventionally manufactured copolymers, three commonly used commercial products (comp1-3) were processed under identical conditions in parallel with copolymers of the invention, wherein comp1 is a ethylene homopolymer and comp2 and 3 are ethylene copolymers. Polymer properties are shown in Table 1.

TABLE 1

| | Experimental run | | | | | | | | | | |
|---|---|---|---|---|---|---|---|---|---|---|---|
| | 1 | 2 | 3 | 4 | 5 | 6 | 7 | 8 | comp 1 | comp 2 | comp 3 |
| Reactor temp. [° C.] | 114 | 114 | 113.6 | 113 | 113 | 113 | 113.8 | 113.4 | | | |
| $N_2$ [% by vol.] | 45 | 43 | 44 | 44 | 44 | 44 | 44 | 43 | | | |
| Hexane [% by vol.] | 2.6 | 2.7 | 2.8 | 2.7 | 3 | 3 | 2.8 | 2.7 | | | |

TABLE 1-continued

| | Experimental run | | | | | | | | | | |
|---|---|---|---|---|---|---|---|---|---|---|---|
| | 1 | 2 | 3 | 4 | 5 | 6 | 7 | 8 | comp 1 | comp 2 | comp 3 |
| Ethylene [% by vol.] | 49.7 | 52.7 | 51.7 | 51.8 | 52 | 52 | 51.4 | 52.4 | | | |
| Hexene [% by vol.] | 0.22 | 0.23 | 0.22 | 0.27 | 0.25 | 0.26 | 0.22 | 0.24 | | | |
| Productivity [kg/g] | 11 | 11 | 11 | 11 | 11 | 11 | 11 | 11 | | | |
| $MFR_{21}$ [g/10 min] | 14.2 | 15.2 | 15.4 | 14.4 | 15.3 | 15.1 | 15.6 | 15.0 | | 16.5 | 6.0 |
| $MFR_5$ [g/10 min] | 0.77 | 0.85 | 0.87 | 0.80 | 0.86 | 0.85 | 0.89 | 0.84 | 6.5 | 0.75 | 0.3 |
| $M_w$ [kg/mol] | 203 | 178 | 183 | 192 | 194 | 214 | 193 | 197 | 150 | 200 | 319 |
| $M_w/M_n$ | 11 | 12 | 13 | 14 | 14 | 15 | 16 | 12 | 10 | 12 | 26 |
| content of comonomer side chains [1/1000C] | 2.3 | 2.1 | 2.2 | 2.4 | 2.3 | 2.2 | 2.2 | 2.1 | 3.4 total CH3 | 2.8 | 1.3 |
| Density [g/cm³] | 0.941 | 0.942 | 0.941 | 0.940 | 0.940 | 0.940 | 0.942 | 0.941 | 0.953 | 0.946 | 0.946 |
| FNCT [h] | 44 | 30 | 26 | 49 | 34 | 41 | 24 | 39 | 2 | 8 | 80 |
| spiral length [cm] | 40.1 | 41.3 | 41.1 | 40.4 | 41.0 | 41.1 | 40.9 | 40.2 | | 40.5 | 36.1 |
| Tensile impact strength [kJ/m²] | 150 | 150 | 150 | 160 | 152 | 146 | 147 | 151 | 72 | 160 | 160 |
| ultimate elongation [%] | >450 | >450 | | >450 | | >450 | | >450 | 108 | 277 | >450 |

The flow properties under processing conditions were determined using the spiral test. The copolymer is, for this purpose, injected at a defined temperature, pressure and screw speed into a spiral mould. This gives copolymer spirals having a particular wall thickness. The length of the spirals is a measure of the flow properties of the copolymer used.

The spiral test was carried out on a Krauss-Maffei machine using a closure force of 900 kN and a 2.5 mm die, measured at a melt temperature of 250° C., an injection pressure of 750 bar, a screw diameter of 3 cm, a screw speed of 100 min⁻¹, a mould temperature of 30° C., a wall thickness of 2 mm and a width of 6 mm.

To test the dimensional and shape stability of the copolymers of the invention, plastic plates were produced by using a plate tool with dimension of 208.1 mm by 146.1 mm by use of an injection moulding machine at 230° C. and an injection pressure of 80 bar, allowed to cool to room temperature, resp. were stored for 48 h at 80° C. and finally cooled to room temperature, the external plate dimensions of specimens were measured, the mean in mm was calculated, the deviation from the plate tool dimension was determined and the test specimens were assessed visually for dimensional and shape stability. The data are shown in Table 2.

The copolymers of the invention display good flow properties with spiral lengths of above 40 cm at an MFR of 14-15.6, measured at a melt temperature of 250° C., an injection pressure of 750 bar, a screw diameter of 3 cm, a screw speed of 100 min⁻¹, a mould temperature of 30° C. and a wall thickness of 2 mm, combined with good dimensional and shape stability (low shrinkage).

TABLE 2

| | Experimental run | | |
|---|---|---|---|
| | 1 | comp 2 | comp 3 |
| shrinkage 24 h, 23° C. [%] | 2.6 | 3.0 | 3.0 |
| shrinkage 48 h, 80° C. [%] | 3.5 | 4.0 | 3.8 |

What is claimed is:

1. A process comprising:
copolymerizing ethylene with at least one $C_3$-$C_{12}$ 1-olefin to produce a monomodal copolymer comprising ethylene and at least one 1-olefin, wherein the monomodal copolymer has:
(i) a $M_w$ in a range of from 150,000-300,000,
(ii) a polydispersity $M_w/M_n$ in a range of from 11-16,
(iii) a density determined according to DIN EN ISO 1183-1, variant A of 0.940-0.942 g/cm³,
(iv) a melt index $MI_5$ of 0.5-1 g/10 min,
(v) a melt index $MFR_{21}$ (ISO 1133; 190° C., 21.6 kg) of 12-17 g/10 min,
(vi) an environmental stress cracking resistance of 25-49 hours, and
(vii) 0.1 to 10 $C_x$ comonomer side chains per 1000 carbon atoms, wherein $C_x$ is equal to or above a value defined by the equation (I)

$$C_x = 128.7 - 134.62 \times d' \quad \text{(I)},$$

wherein d' is the numerical value of the density of the copolymer in g/cm³,
(viii) 0.1-1% by weight of an additive; and
(ix) a spiral length of greater than 40 cm at an $MFR_{21}$ of 14-15.6, and
preparing an injection molded article comprising the monomodal copolymer of ethylene and at least one 1-olefin.

2. The process according to claim 1, wherein ethylene and at least one C3-C12 1-olefin are copolymerized in the presence of a chromium catalyst.

3. The process according to claim 1, wherein the copolymerization is conducted in at least one gas-phase reactor.

4. The process according to claim 1, wherein the copolymerization is carried out at a temperature which is in a range restricted by an upper limit defined by equation (III)

$$T_H = 173 + 6d'/(0.840 - d') \quad \text{(III)}$$

and a lower limit defined by equation (IV)

$$T_L = 178 + 7.3d'/(0.837 - d') \quad \text{(IV)}$$

in which the variables have the following meanings:
$T_H$ is the highest reaction temperature in °C.;
$T_L$ is the lowest reaction temperature in °C.; and
d' is the numerical value of the density d of the copolymer to be synthesized.

5. The process according to claim 1, wherein the injection molded article is selected from the group consisting of a cap, closure, screw cap, screw closure, tube shoulder, engineering part pipe fitting and fuel tank module part.

* * * * *

UNITED STATES PATENT AND TRADEMARK OFFICE
CERTIFICATE OF CORRECTION

PATENT NO. : 10,626,202 B2
APPLICATION NO. : 12/449082
DATED : April 21, 2020
INVENTOR(S) : Foettinger et al.

It is certified that error appears in the above-identified patent and that said Letters Patent is hereby corrected as shown below:

On the Title Page

Column 1, Item (30), Line 1, delete "07002187" and insert -- 07002187.8 --, therefor In the Specification In Column 12, Line 17, delete "° to 125° C." and insert -- 30° to 125° C. --, therefor In the Claims In Column 16, Claim 1, Line 28, delete "$_1$-olefin" insert -- 1-olefin --, therefor In Column 17, Claim 5, Line 9, after "part" insert -- , --

Signed and Sealed this
Third Day of January, 2023

Katherine Kelly Vidal
*Director of the United States Patent and Trademark Office*